United States Patent [19]

Charbonnet

[11] 4,373,846
[45] Feb. 15, 1983

[54] PANEL TRANSFERRING APPARATUS
[76] Inventor: Carl D. Charbonnet, 4800 Divison Ave., Birmingham, Ala. 35222
[21] Appl. No.: 200,417
[22] Filed: Oct. 24, 1980
[51] Int. Cl.³ .............................................. B65G 1/06
[52] U.S. Cl. ...................................... 414/331; 271/9; 271/128; 414/119; 414/417
[58] Field of Search .............. 414/119, 417, 416, 331; 221/88, 87, 69; 271/128, 130, 9, 154, 155, 152, 8 R; 353/116; 406/72; 198/747

[56] References Cited

U.S. PATENT DOCUMENTS

| | | | |
|---|---|---|---|
| 3,195,740 | 7/1965 | Lange et al. ..................... | 414/119 X |
| 3,532,231 | 10/1970 | Cook ................................... | 414/119 |
| 3,659,837 | 5/1972 | Umahashi ............................... | 271/9 |
| 3,921,788 | 11/1975 | Roberson et al. .............. | 414/417 X |
| 4,236,851 | 12/1980 | Szasz .................................. | 406/72 |
| 4,311,427 | 1/1982 | Coad et al. ...................... | 414/417 X |

FOREIGN PATENT DOCUMENTS 620316  7/1978  U.S.S.R. ............................... 414/119

Primary Examiner—Bruce H. Stoner, Jr
Attorney, Agent, or Firm—Woodford R. Thompson, Jr.

[57] ABSTRACT

A supporting cage carrying a plurality of vertically spaced panels is operatively connected to an actuator which moves the cage upwardly through a series of movements to selected vertical positions. A control member connected to the actuator limits upward movement of the cage so that each panel is aligned sequentially with an elongated ram which moves in a rectilinear direction in spaced relation to the adjacent panel to eject the aligned panel from the cage. The next panel is then moved upward and ejected with this cycle being repeated until the cage is empty.

1 Claim, 7 Drawing Figures

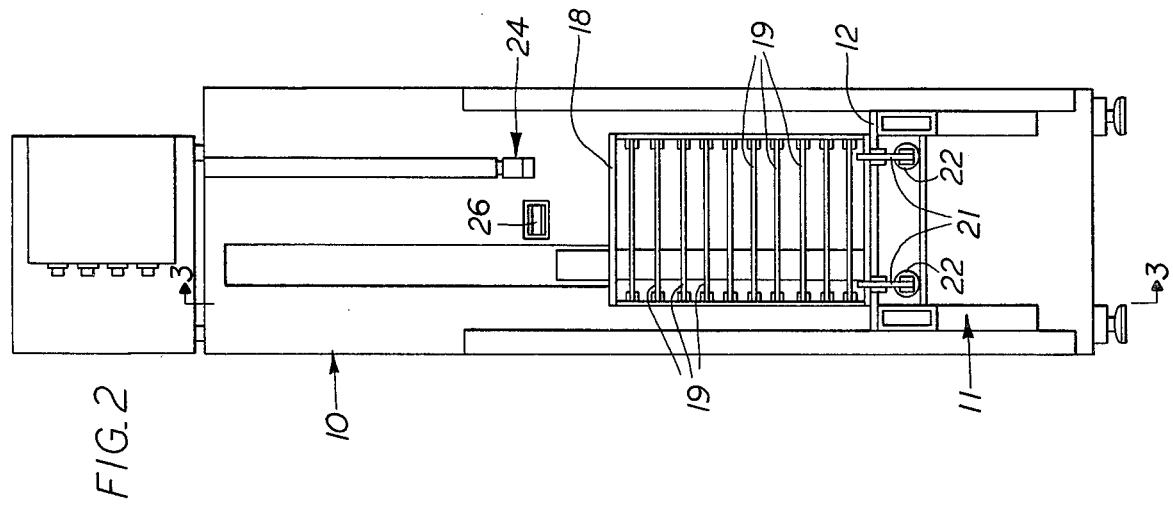
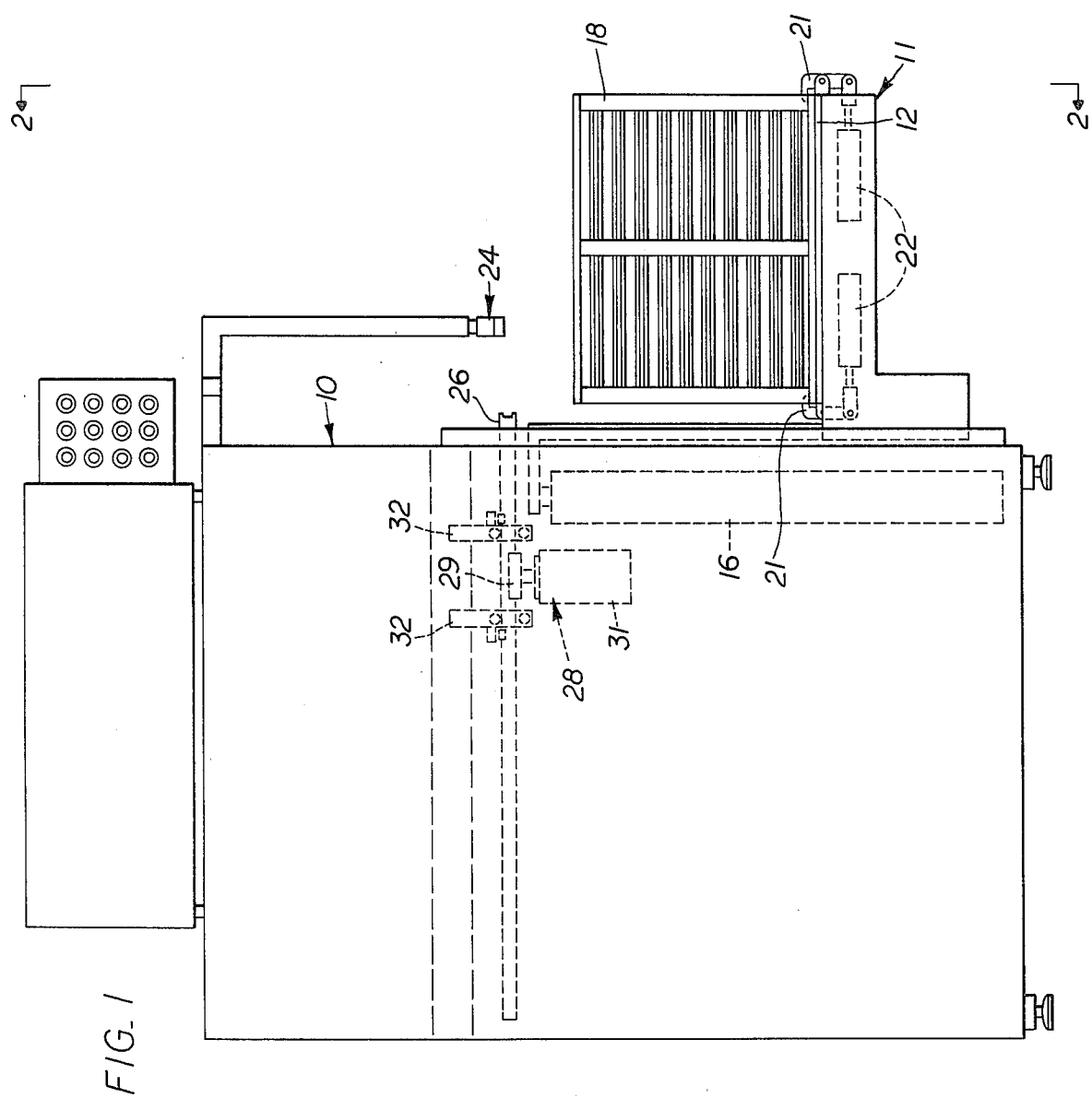

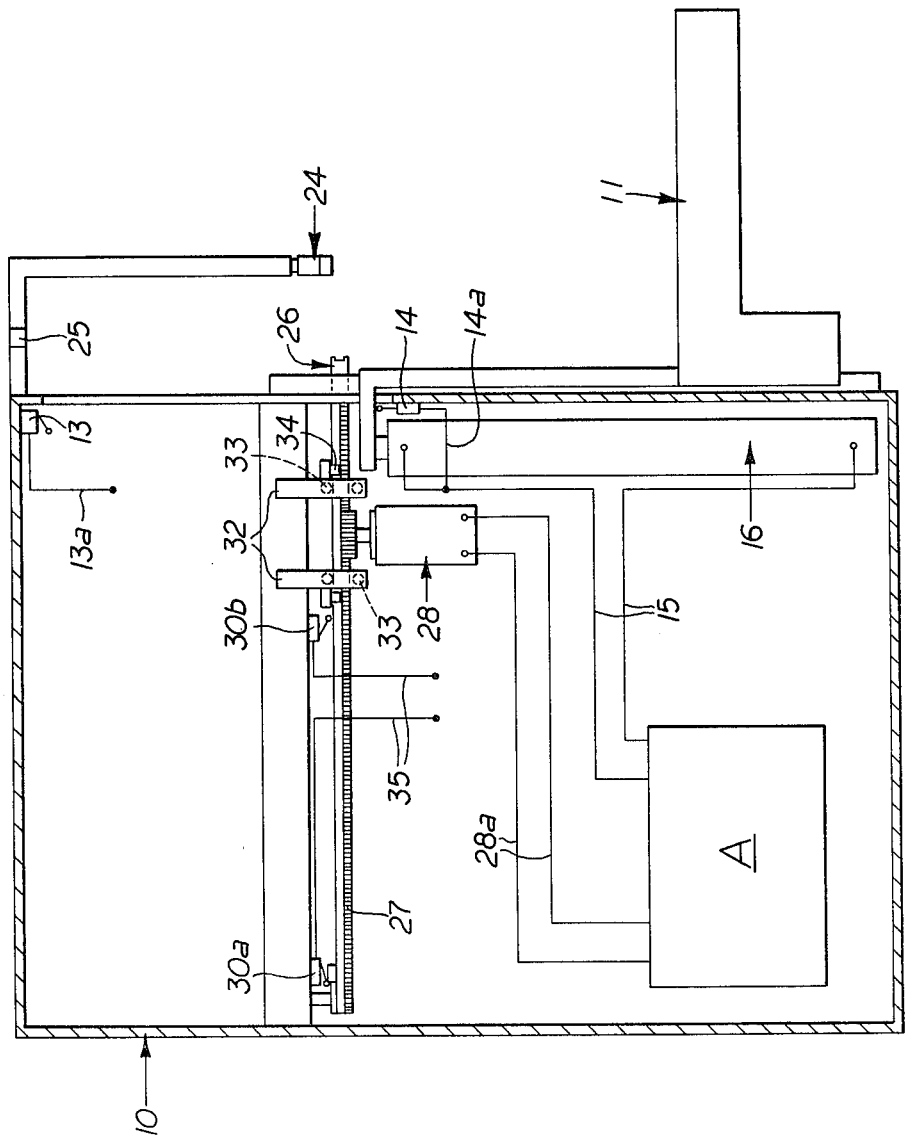

PANEL TRANSFERRING APPARATUS

BACKGROUND OF THE INVENTION

This invention relates to apparatus for transferring panel-like members and more particularly to apparatus for transferring panel-like members, such as printed circuit boards, from a supporting cage by an elongated ram or bar-like member.

Heretofore in the art to which my invention relates, difficulties have been encountered with conventional devices used to transfer panel-like members due to the fact that they operate in an inconsistent and unreliable manner. That is, the ram member of such devices is not supported properly to eject a panel-like member, such as a printed circuit board, without there being some chance of damage to the board or the printed circuit thereon. Such prior art devices with which I am familiar, use the rod of a fluid pressure operated cylinder as the ram member. When this rod is fully extended, its forwardmost end tilts downwardly whereby it engages and scratches or causes damage to the photoresistant coated upper surface of the subjacent printed circuit board. This is entirely unsatisfactory in view of the great reliance and high quality performance required from printed circuitry today.

Difficulties have also been encountered with such prior art devices due to the fact that no effective sensing and indexing mechanism has been devised for aligning the uppermost printed circuit board with the ram member. Conventional sensing mechanisms with which I am familiar sense the rear edge of the uppermost printed circuit board and often on occasion malfunction after the supporting cage has been slightly damaged or bent. Also, conventional indexing mechanism usually included means for moving the supporting cage upwardly in predetermined increments so that it is stopped at each increment even though the supporting cage is void of a printed circuit board at that point. This causes an unnecessary waste of time and energy.

SUMMARY OF THE INVENTION

In accordance with my invention, I overcome the above and other difficulties by providing apparatus for transferring printed circuit boards which is simple of construction, economical of manufacture and requires a minimum of time and effort for operation in a safe, consistent, and reliable manner.

An object of my invention is to provide a positive support and guide for the elongated ram at all times which causes it to travel in a straight line and in spaced relation to the subjacent printed circuit board without contacting, scratching or causing damage thereto in any manner.

Another object of my invention is to provide a sensing mechanism which is reliable in operation due to the fact that it senses the flat upper surface of the printed circuit board thus eliminating malfunctioning due to the supporting cage being slightly damaged or bent.

A further object of my invention is to provide an improved indexing mechanism which stops upward movement of the supporting cage only when there is a printed circuit board to be unloaded. This eliminates the unnecessary and time-consuming incremental stopping of the supporting cage when voids are present therein.

My improved apparatus embodies actuator means operatively connected to a supporting cage which carries a plurality of panel-like members, such as printed circuit boards. Control means senses upward movement of the uppermost panel-like member and aligns it with a positively supported bar-like member which travels in a rectilinear direction to eject the uppermost printed circuit board onto a conventional conveyor. The next printed circuit board then moves upward and into position for ejection from the supporting cage. This procedure is repeated until the last printed circuit board is ejected from the cage.

DESCRIPTION OF THE DRAWINGS

Apparatus embodying features of my invention is illustrated in the accompanying drawings, forming a part of this application, in which:

FIG. 1 is a side elevational view showing the bar-like member in its retracted position and in position to align with the uppermost printed circuit board carried by the supporting cage.

FIG. 2 is a front elevational view taken generally along the line 2—2 of FIG. 1;

FIG. 7 is a vertical sectional view corresponding generally to FIG. 3 showing a hydraulic system operatively connecting the actuator means to the control means, with the cage being omitted.

DETAILED DESCRIPTION

Figure 4:
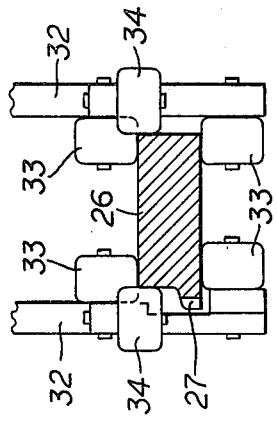
FIG. 4 is an enlarged fragmental, sectional view showing the means for supporting the elongated bar-like member.

Referring now to the drawings for a better understanding of my invention, I show in FIGS. 1, 2, 3 and 7 a supporting frame 10 operatively connected to an actuator member, shown generally at 11. The actuator member comprises a plate-like member 12, upper and lower limit switches 13 and 14, respectively, and a hydraulically operated cylinder 16. The cylinder 16 is connected to a hydraulic unit as shown at "A" in FIG. 7 by suitable lines 15 for moving the plate-like member 12 upwardly and sequentially through a series of vertical movements to selected vertical positions. The uppermost position of the plate-like member 12 is indicated by dotted lines in FIG. 3, and the lowermost position is indicated by solid lines. The limit switch 13, connected to the hydraulic unit A by a suitable line 13$^a$, limits upward movement of the plate-like member 12 while the limit switch 14, connected to the hydraulic unit by a suitable line 14$^a$, limits downward movement thereof.

A supporting cage 18 carries a plurality of panel-like members, such as printed circuit boards 19, in vertical spaced relation to each other. The cage 18 is detachably connected to the plate-like member 12 by conventional clamps 21 as shown. Hydraulically operated cylinders 22 controlled by suitable means such as a foot valve, not shown, actuates the clamps 21 to connect and disconnect the supporting cage 18 carried by the plate-like member 12. Since clamps 21 are of a conventional type well known in the art, no further description thereof is deemed necessary.

Figure 3:
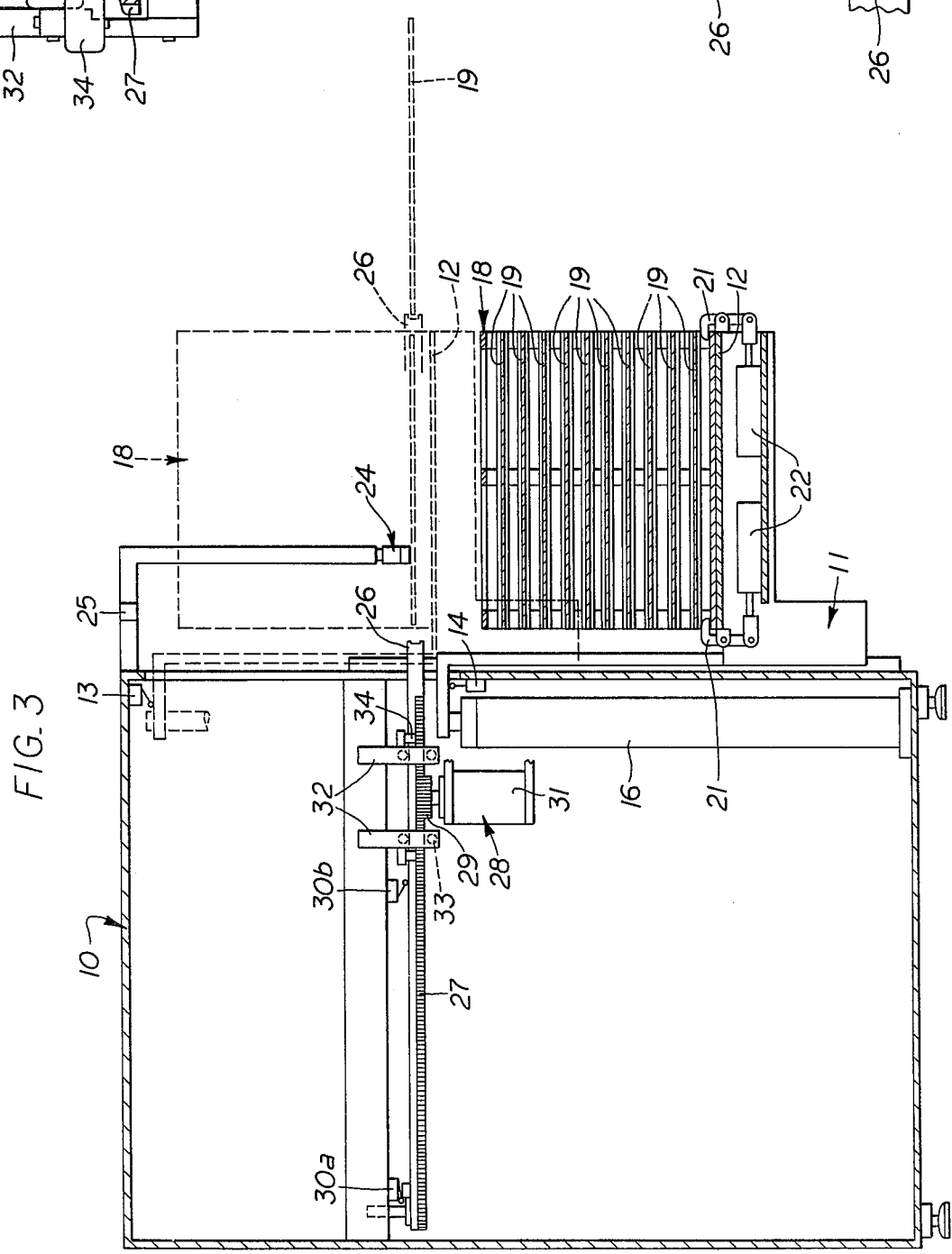
FIG. 3 is a vertical sectional view taken generally along the line 3—3 of FIG. 2.

As shown in FIGS. 3 and 7, a control member in the form of a conventional type proximity sensor 24 is operatively connected to the actuator member 11 by a limit switch 25 and suitable lines, not shown. The proximity sensor 24 is in position to sense the upper flat surface of the uppermost printed circuit board 19 carried by the supporting cage 18. In view of the fact that the sensor 24 may be adjusted to selected vertical positions in a manner well understood in the art, no further description is deemed necessary. Upward movement of the supporting cage 18 is controlled by the proximity sensor 24 so that the uppermost printed circuit board 19 is aligned with an elongated bar-like member 26 carried by the supporting frame 10. The sensor 24 only stops upward movement of the cage 18 when it senses the presence of the flat upper surface of the uppermost printed circuit board carried by the cage.

An elongated rack 27 is carried by the bar-like member 26 in position to engage a drive unit 28 operatively connected to the supporting frame 10 and the hydraulic unit A by suitable lines 28$^a$. The drive unit 28 includes a pinion 29 carried by a conventional hydraulic motor 31 which imparts reciprocatory movement to the bar-like member 26 selectively to a retracted position as shown in solid lines in FIGS. 1-3 and to an extended position as shown by dotted lines in FIG. 3. Limit switches 30$^a$ and 30$^b$, operatively connected to the hydraulic unit A by lines 35, limit movement of the bar-like member 26 to its retracted and extended positions, respectively, as shown in FIGS. 3 and 7.

As shown in FIG. 3, support brackets 32 are carried by the supporting frame 10 in position to support upper and lower guide members 33 which provide a positive support for the bar-like member 26 at all times. That is, the guide members 33 are positioned to engage the upper and lower surfaces of the bar-like member 26 so that it travels in a rectininear direction above and out of engagement with the subjacent printed circuit board 19. The guide members 33 are shown as being in the form of two pairs of oppositely disposed and vertically spaced roller-like members. However, the number of roller-like guide members 33 may be varied. The roller-like guide members 33 engage the upper and lower surfaces of the bar-like member 26, as shown in FIGS. 3 and 4, to limit vertical movement thereof.

As shown in FIG. 4, two oppositely disposed and laterally spaced retainer members in the form of rollers 34 engage the sides of the bar-like member 26 above the rack 27 to limit lateral movement thereof. While I have shown the retainer members 34 as being rollers, it is to be understood that they could assume other forms.

Figure 5:
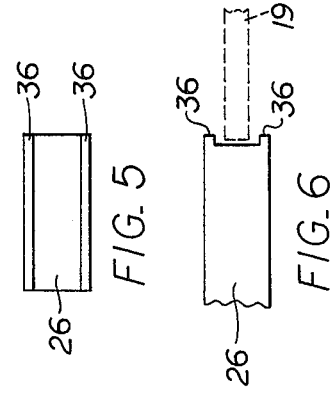
FIG. 5 is an enlarged end view of the elongated bar-like member.
Figure 6:
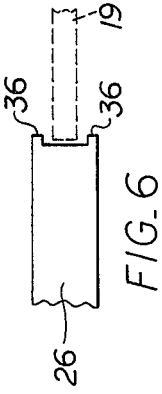
FIG. 6 is an enlarged fragmental view showing the bar-like member engaging a printed circuit board.

A pair of spaced apart forwardly extending flanges 36 are carried by the forwardmost end of the bar-like member 26, as shown in FIGS. 5 and 6. The flanges 36 are in position to aid in aligning and centering the uppermost printed circuit board 19 relative to the bar-like member 26 when engaged thereby so that the board 19 is ejected onto a suitable conveyor, not shown.

From the foregoing description, the operation of my improved apparatus will be readily understood. The plate-like member 12 is positioned in its lowermost position and clamped to a full supporting cage carrying a plurality of vertically spaced printed circuit boards 19. Fluid is then introduced into the cylinder 16 to elevate the plate-like member 12 until the proximity sensor 24 senses the presence of the uppermost printed circuit board 19. The proximity sensor 24 limits movement of the uppermost printed circuit board 19 upon reaching its uppermost position and aligns it with the elongated bar-like member 26 while it is in the retracted position as shown in FIG. 3. The bar-like member 26 positively supported by guide members 33 and retainer members 34, is then moved forward in a rectilinear direction whereby it contacts the adjacent edge of the uppermost printed circuit board 19 and pushes it out of the supporting cage 18 and ejects it onto a suitable conveyor. The bar-like member 26 is then moved inwardly to its retracted position. The plate-like member 12 carrying the cage 18 is then moved upwardly again until the proximity sensor 24 senses the upper surface of the next uppermost printed circuit board 19 and aligns it with the bar-like member 26. The bar-like member 26 is then cycled or reciprocated again whereby it moves to its extended position to eject the adjacent printed circuit board 19 and then returns to its retracted position. The upward sequential movement of the plate-like member 12 and cycling of the bar-like member 26 continue until all the printed circuit boards 19 have been ejected from the supporting cage 18. The plate-like member 12 is at its uppermost position usually when the last printed circuit board 19 is ejected. The plate-like member 12 is then moved downwardly to its lowermost position by means of the cylinder 16.

From the foregoing, it will be seen that I have devised an improved apparatus for transferring printed circuit boards from a supporting cage which is simple of construction and economical in its manufacture. Also, my improved apparatus requires a minimum of time and effort for operation in a safe, consistent and reliable manner. Furthermore, I provide positive means for supporting the bar-like member which causes it to travel in a rectilinear direction above and out of engagement with the subjacent printed circuit board at all times. That is, my supports prevent the forwardmost end of the bar-like member from tilting downwardly as it moves to its extended position. Furthermore, I provide improved control means which stop vertical movement of the supporting cage only when there is a printed circuit board in position to be ejected.

While I have shown my invention in but one form, it will be obvious to those skilled in the art that it is not so limited, but is susceptible of various changes and modifications without departing from the spirit thereof.

What I claim is:

1. Apparatus for transferring panel-like members selectively from a supporting cage in which the panel-like members are supported in vertically spaced relation to each other with the apparatus including an elongated reciprocable bar-like member carried by a supporting frame, the improvement comprising:
    (a) a horizontal, movable plate-like member detachably connected to the lower end of said cage,
    (b) a hydraulic cylinder mounted within the confines of said supporting frame in laterally spaced relation to said cage and connected to said plate-like member for moving said cage upwardly and sequentially through a series of movements to selected vertical positions and downwardly to a lowermost position,
    (c) a proximity sensor operatively connected to said cylinder and carried by said supporting frame in position to sense the upper surface of the uppermost panel-like member carried by said cage and limit upward vertical movement of said cage in response to movement of each said uppermost panel-like member to a predetermined uppermost position with each successive upward movement of said cage placing said uppermost panel-like member carried therein in said predetermined uppermost position and in alignment with said bar-like member,
(d) a first limit switch limiting upward movement of said cage to an uppermost position,
(e) a second limit switch limiting downward movement of said cage to said lowermost position,
(f) a pinion drive unit carried by said frame and engaging an elongated rack carried by said bar-like member with said pinion drive unit and said rack imparting horizontal rectilinear movement to said bar-like member selectively to a retracted position with the outer end of said bar-like member being inwardly of the adjacent edge of said uppermost panel-like member and to an extended position to eject said uppermost panel-like member from said cage,
(g) at least one pair of oppositely disposed and vertically spaced roller-like members carried by said frame in position to engage the upper and lower surfaces of said bar-like member and limit vertical movement thereof upon movement of said bar-like member to and from said extended position so that said bar-like member travels in a rectilinear direction above and out of engagement with the panel-like member subjacent thereto,
(h) at least one pair of oppositely disposed and laterally spaced roller-like elements carried by said frame in position to engage said bar-like member and limit lateral movement thereof, and
(i) stop means carried by said frame and operatively connected to said pinion drive unit for limiting movement of said bar-like member to said extended position and to said retracted position.

* * * * *